(12) United States Patent
Guo et al.

(10) Patent No.: US 9,800,560 B1
(45) Date of Patent: Oct. 24, 2017

(54) SYSTEMS AND METHODS FOR MONITORING ENCRYPTED DATA TRANSMISSION

(71) Applicant: Symantec Corporation, Mountain View, CA (US)

(72) Inventors: Fanglu Guo, Los Angeles, CA (US); Susanta K. Nanda, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 118 days.

(21) Appl. No.: 14/693,912

(22) Filed: Apr. 23, 2015

(51) Int. Cl.
*H04L 9/32* (2006.01)
*H04L 29/06* (2006.01)
*H04L 9/08* (2006.01)

(52) U.S. Cl.
CPC ........ *H04L 63/0435* (2013.01); *H04L 9/0822* (2013.01); *H04L 63/0442* (2013.01); *H04L 2209/24* (2013.01)

(58) Field of Classification Search
CPC .............. H04L 63/0435; H04L 9/0822; H04L 63/0442; H04L 2209/24
See application file for complete search history.

(56) References Cited

U.S. PATENT DOCUMENTS

| | | | | |
|---|---|---|---|---|
| 7,055,027 B1* | 5/2006 | Gunter | ................... | H04L 63/30 709/223 |
| 2014/0281510 A1* | 9/2014 | Buruganahalli | .... | H04L 63/1408 713/164 |

OTHER PUBLICATIONS

Iveson, Steven "Using Wireshark to Decode SSL/TLS Packets", http://packetpushers.net/using-wireshark-to-decode-ssltls-packets/, as accessed Feb. 27, 2015, (Aug. 7, 2013).
"How to Export and Use SSL Session Keys to Decrypt SSL Traces Without Sharing the SSL Private Key", http://support.citrix.com/article/CTX135889, as accessed Feb. 27, 2015, Citrix Support, CTX135889, (Mar. 26, 2014).
Ivanov, Ivo "API hooking revealed", http://www.codeproject.com/Articles/2082/API-hooking-revealed, as accessed Feb. 27, 2015, (Dec. 2, 2002).
"Public-key cryptography", http://en.wikipedia.org/wiki/Public-key_cryptography, as accessed Feb. 27, 2015, Wikipedia, (Jan. 4, 2004).
"Transport Layer Security", http://en.wikipedia.org/wiki/Transport_Layer_Security, as accessed Feb. 27, 2015, Wikipedia, (Jan. 7, 2004).

(Continued)

*Primary Examiner* — Mohammed Waliullah
(74) *Attorney, Agent, or Firm* — FisherBroyles, LLP

(57) ABSTRACT

The disclosed computer-implemented method for monitoring encrypted data transmission may include (1) detecting a data transmission session between an application running on a first device and an application running on a second device, (2) identifying a shared library loaded by the application running on the first device to establish encryption for the data transmission session, (3) retrieving, from the shared library, a symmetric session key designated for the data transmission session, (4) intercepting data transmitted during the data transmission session, the data having been encrypted using the symmetric session key, and (5) decrypting the data utilizing the symmetric session key retrieved from the shared library. Various other methods, systems, and computer-readable media are also disclosed.

20 Claims, 8 Drawing Sheets

(56) References Cited

OTHER PUBLICATIONS

"What is SSL?", https://www.globalsign.com/en/ssl-information-center/what-is-ssl/, as accessed Mar. 30, 2015, GlobalSign, (Mar. 30, 2015).

"Behind the Scenes of SSL Cryptography", https://www.digicert.com/ssl-cryptography.htm, as accessed Feb. 27, 2015, DigiCert® Inc., (Mar. 5, 2013).

* cited by examiner

SYSTEMS AND METHODS FOR MONITORING ENCRYPTED DATA TRANSMISSION

BACKGROUND

As data exchange over computer networks increases, so do concerns for the security and privacy of such data exchange. As a result, data is increasingly transmitted using encryption protocols such as Secure Sockets Layer or Transport Layer Security. While these protocols may successfully prevent security or privacy breaches, such as man-in-the-middle attacks, these protocols may also interfere with authorized security applications that monitor network traffic. As such, effective encryption protocols may prevent security applications from monitoring and/or protecting valuable data. In some instances, encryption protocols may also allow attackers to encrypt their data transmission, thereby evading any kind of detection.

Traditional data protection solutions may attempt to inspect encrypted data transmission by accessing the transmitted data on an end point sending or receiving the data. For example, traditional data protection solutions may utilize a monitoring application running on the end point. However, these solutions may be difficult to deploy and/or maintain. Additionally, these solutions may be bypassed by advanced attackers. Moreover, emerging platforms, such as smartphones and tablets, may not allow monitoring by security applications. As such, the instant disclosure identifies a need for improved systems and methods for monitoring encrypted data transmission.

SUMMARY

As will be described in greater detail below, the instant disclosure describes various systems and methods for monitoring an encrypted data transmission session of a device by intercepting data transmitted during the data transmission session and using a session key retrieved from a shared library of the device to decrypt the intercepted data. In one example, a computer-implemented method for monitoring encrypted data transmission may include (1) detecting a data transmission session between an application running on a first device and an application running on a second device, (2) identifying a shared library loaded by the application running on the first device to establish encryption for the data transmission session, (3) retrieving, from the shared library, a symmetric session key designated for the data transmission session, (4) intercepting data transmitted during the data transmission session, the data having been encrypted using the symmetric session key, and (5) decrypting the data utilizing the symmetric session key retrieved from the shared library.

In some examples, detecting the data transmission session may include determining that the application running on the first device has received an asymmetric public key from the application running on the second device. Additionally or alternatively, detecting the data transmission session may include determining that the first device has attempted to access an Internet resource of the second device.

In one embodiment, the application running on the first device may establish the encryption for the data transmission session by obtaining, from the shared library, the symmetric session key. In this embodiment, the application running on the first device may encrypt the symmetric session key with an asymmetric public key received from the application running on the second device and send the encrypted symmetric session key to the application running on the second device. Also in this embodiment, the application running on the first device and/or the application running on the second device may encrypt, using the symmetric session key, the data transmitted during the data transmission session prior to transmitting the data.

In some examples, prior to retrieving the symmetric session key from the shared library, the shared library may receive the symmetric session key from the application running on the second device. In these examples, prior to the shared library receiving the symmetric session key from the application running on the second device, the application running on the first device may send an asymmetric public key to the application running on the second device and the application running on the second device may encrypt the symmetric session key with the asymmetric public key.

In some examples, detecting the data transmission session may include determining that a monitoring system is authorized to monitor the data transmitted during the data transmission session. In these examples, the method may include identifying a policy that gives the monitoring system permission to monitor data transmission sessions that include a specified characteristic and determining that the data transmission session includes the specified characteristic designated in the policy. In one embodiment, the specified characteristic may include a reputation score of the first device and/or the second device that exceeds a threshold score designated by the policy, a location of the first device and/or the second device that matches a location designated by the policy, a time at which the data transmission session is initiated that falls within a time period designated by the policy, content of a webpage accessed as part of the data transmission session that matches content designated by the policy, and/or an Internet service provider utilized by the data transmission session that matches an Internet service provider designated by the policy.

In one embodiment, retrieving the symmetric session key from the shared library may include retrieving the symmetric session key via a local monitoring agent on the first device that monitors the shared library. In this example, the local monitoring agent may monitor the shared library by hooking an application programming interface (API) of the shared library to identify system calls that invoke the API. In some examples, hooking the API may include modifying a method table of the shared library. In these examples, the method table may include an entry for a method responsible for handling symmetric session keys, such that calls to the method are redirected to a memory address associated with the local monitoring agent.

In one example, retrieving the symmetric session key from the shared library may include receiving the symmetric session key at a remote monitoring node that intercepts and analyzes communications transmitted to and/or from the first device. In this example, the remote monitoring node may include a third device that is separate and distinct from the first device and the second device.

In one embodiment, receiving the symmetric session key at the remote monitoring node may include receiving the symmetric session key via an additional data transmission session between a local monitoring agent on the first device that monitors the shared library and an application running on the remote monitoring node. In this embodiment, the additional data transmission session may be distinct from the data transmission session between the application running on first device and the application running on the second device. In some examples, receiving the symmetric session key via an additional data transmission session may include sending an asymmetric public key from the remote monitoring node to the local monitoring agent and receiving a version of the symmetric session key from the local monitoring agent that has been encrypted using the asymmetric public key from the remote monitoring node.

In one example, the method may further include, upon decrypting the data, applying a security policy to the decrypted data by analyzing the decrypted data to determine whether the decrypted data complies with the policy. In some examples, intercepting the data may include temporarily preventing the data from being transmitted at least until the security policy is applied to the decrypted data. In some embodiments, the method may further include performing a security action based on a result of applying the security policy to the decrypted data.

In one embodiment, a system for implementing the above-described method may include (1) a detection module, stored in memory, that detects a data transmission session between an application running on a first device and an application running on a second device, (2) an identification module, stored in memory, that identifies a shared library loaded by the application running on the first device to establish encryption for the data transmission session, (3) a retrieval module, stored in memory, that retrieves, from the shared library, a symmetric session key designated for the data transmission session, (4) an interception module, stored in memory, that intercepts data transmitted during the data transmission session, the data having been encrypted using the symmetric session key, (5) a decryption module, stored in memory, that decrypts the data utilizing the symmetric session key retrieved from the shared library, and (6) at least one physical processor configured to execute the detection module, the identification module, the retrieval module, the interception module, and the decryption module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a data transmission session between an application running on a first device and an application running on a second device, (2) identify a shared library loaded by the application running on the first device to establish encryption for the data transmission session, (3) retrieve, from the shared library, a symmetric session key designated for the data transmission session, (4) intercept data transmitted during the data transmission session, the data having been encrypted using the symmetric session key, and (5) decrypt the data utilizing the symmetric session key retrieved from the shared library.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
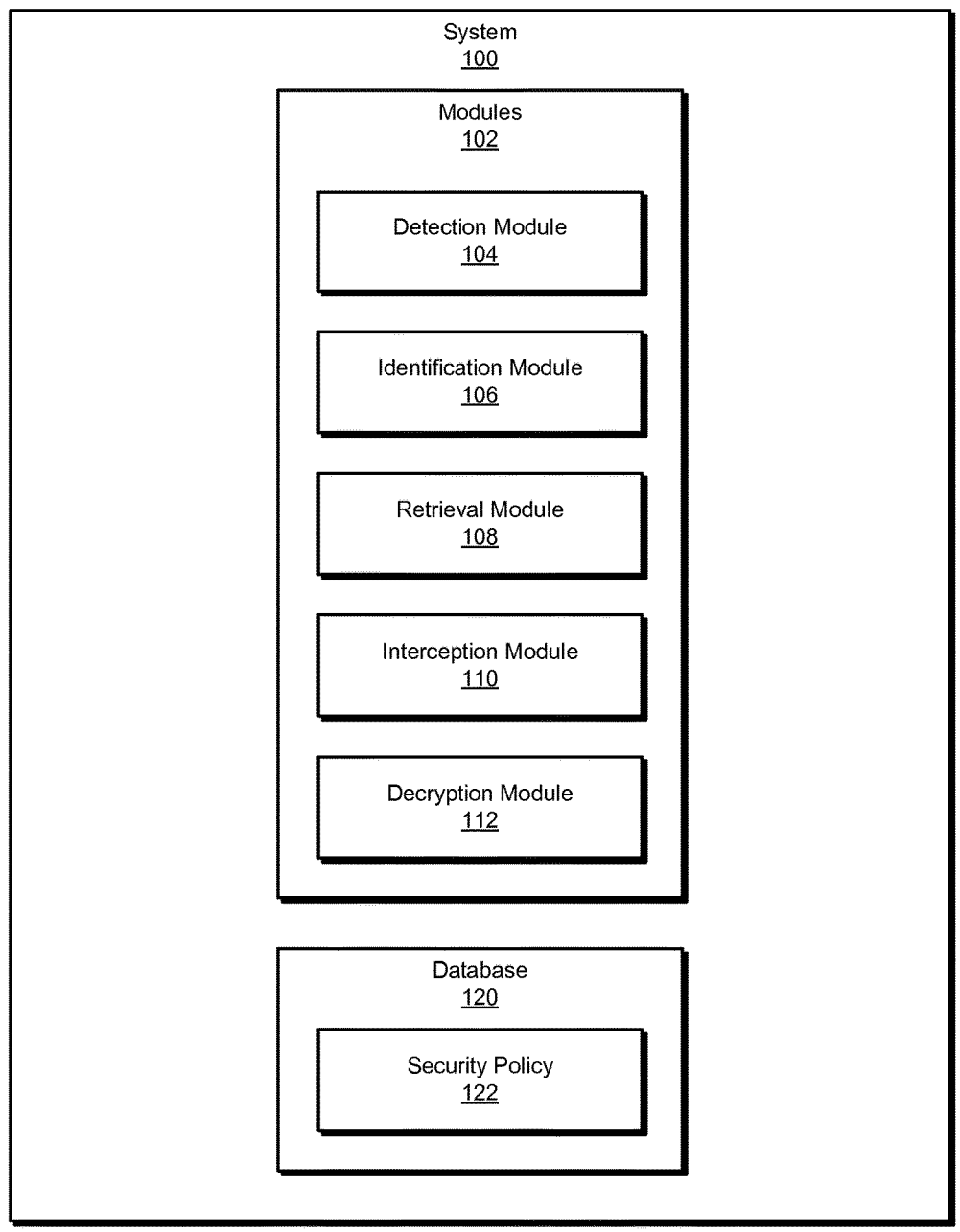
FIG. 1 is a block diagram of an exemplary system for monitoring encrypted data transmission.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for monitoring encrypted data transmission. As will be explained in greater detail below, by retrieving a symmetric session key from a shared library of a device, the systems and methods described herein may effectively monitor data, encrypted with the symmetric session key, that an application of the device is sending and/or receiving as part of a data transmission session associated with the symmetric session key. For example, after retrieving the symmetric session key, the disclosed systems and methods may intercept the encrypted data that the device is sending and/or receiving and decrypt the intercepted data using the symmetric session key to ascertain the contents. Retrieving and using the symmetric session key in this way may both simplify the monitoring of data transmission sessions and make the monitoring more secure. For example, in data transmission sessions between computing devices that use public-key cryptography to establish a symmetric session key, the disclosed systems and methods may monitor the data transmission sessions by obtaining the symmetric session key information instead of more intrusively obtaining public key information.

The following will provide, with reference to FIGS. 1-2 and 4-6, detailed descriptions of exemplary systems for monitoring encrypted data transmission. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for monitoring encrypted data transmission. As illustrated in this figure, exemplary system 100 may include one or more modules 102 for performing one or more tasks. For example, and as will be explained in greater detail below, exemplary system 100 may include a detection module 104 that may detect a data transmission session between an application running on a first device and an application running on a second device. Exemplary system 100 may additionally include an identification module 106 that may identify a shared library loaded by the application running on the first device to establish encryption for the data transmission session. Exemplary system 100 may also include a retrieval module 108 that may retrieve, from the shared library, a symmetric session key designated for the data transmission session. Exemplary system 100 may additionally include an interception module 110 that may intercept data transmitted during the data transmission session, the data having been encrypted using the symmetric session key. Exemplary system 100 may also include a decryption module 112 that may decrypt the data utilizing the symmetric session key retrieved from the shared library. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, computing device 208, and/or remote monitoring node 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more security policies, such as security policy 122. Database 120 may represent portions of a single database or computing device or a plurality of databases or computing devices. For example, database 120 may represent a portion of remote monitoring node 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as remote monitoring node 206 in FIG. 2, computing system 710 in FIG. 7, and/or portions of exemplary network architecture 800 in FIG. 8.

Figure 2:
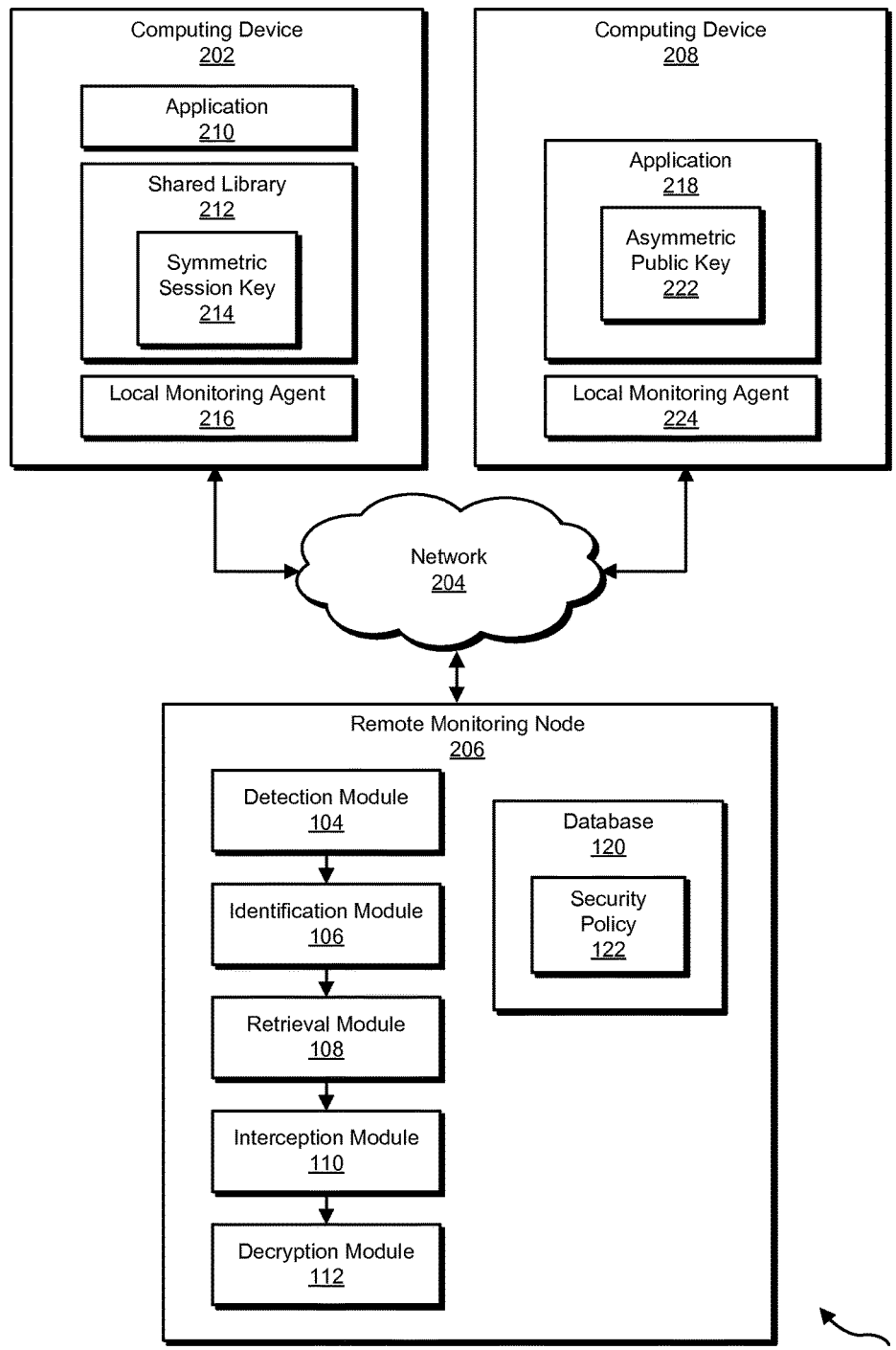
FIG. 2 is a block diagram of an additional exemplary system for monitoring encrypted data transmission.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing device 208 and a remote monitoring node 206 via a network 204. In some examples, remote monitoring node 206 may monitor a data transmission session between computing device 202 and computing device 208. In one example, computing device 202 may be programmed with one or more of modules 102 and/or may store all or a portion of the data in database 120. Additionally or alternatively, computing device 208 may be programmed with one or more of modules 102 and/or may store all or a portion of the data in database 120. Additionally or alternatively, remote monitoring node 206 may be programmed with one or more of modules 102 and/or may store all or a portion of the data in database 120.

In one embodiment, one or more of modules 102 from FIG. 1 may, when executed by at least one processor of computing device 202, computing device 208, and/or remote monitoring node 206, enable computing device 202, computing device 208, and/or remote monitoring node 206 to monitor encrypted data transmission. For example, and as will be described in greater detail below, detection module 104 may detect a data transmission session between an application 210 running on computing device 202 and an application 218 running on computing device 208. Identification module 106 may identify a shared library 212 loaded by application 210 running on computing device 202. Retrieval module 108 may retrieve, from shared library 212, a symmetric session key 214 designated for the data transmission session. Interception module 110 may intercept data transmitted during the data transmission session, the data having been encrypted using symmetric session key 214. Decryption module 112 may decrypt the data utilizing symmetric session key 214 retrieved from shared library 212.

Computing device 202 and computing device 208 generally represent any type or form of computing device capable of reading computer-executable instructions. Examples of computing device 202 and computing device 208 may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device. In some examples, computing device 202 and computing device 208 may represent two nodes of a same network. In some examples, computing device 202 may represent a user device and computing device 208 may represent a server, such as a web server hosting a webpage that computing device 202 is attempting to access. In some examples, computing device 202 and computing device 208 may represent two servers involved in an inter-server data transmission session.

Remote monitoring node 206 generally represents any type or form of computing device that is capable of monitoring data transmission. Examples of remote monitoring node 206 include, without limitation, servers such as application servers and database servers configured to provide various database services and/or run certain software applications. In some examples, remote monitoring node 206 may refer to a computing system that is separate and distinct from computing device 202 and computing device 208 and that monitors the activity of computing device 202 and/or computing device 208. In some examples, remote monitoring node 206 may monitor the activity of computing device 202 and/or computing device 208 by intercepting and analyzing communications transmitted to and/or from computing device 202 and/or computing device 208.

In some examples, remote monitoring node 206 may represent a node on a same network that also includes computing device 202 and/or computing device 208. In some examples, remote monitoring node 206 may represent a firewall. In some examples, remote monitoring node 206 may operate as part of a monitoring service that enforces data-loss protection policies that may apply to computing device 202 and/or computing device 208. Additionally or alternatively, remote monitoring node 206 may operate as part of a security service that provides security services for computing device 202 and/or computing device 208.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and remote monitoring node 206. Additionally or alternatively, network 204 may facilitate communication between computing device 202 and computing device 208. Additionally or alternatively, network 204 may facilitate communication between computing device 208 and remote monitoring node 206

Figure 3:
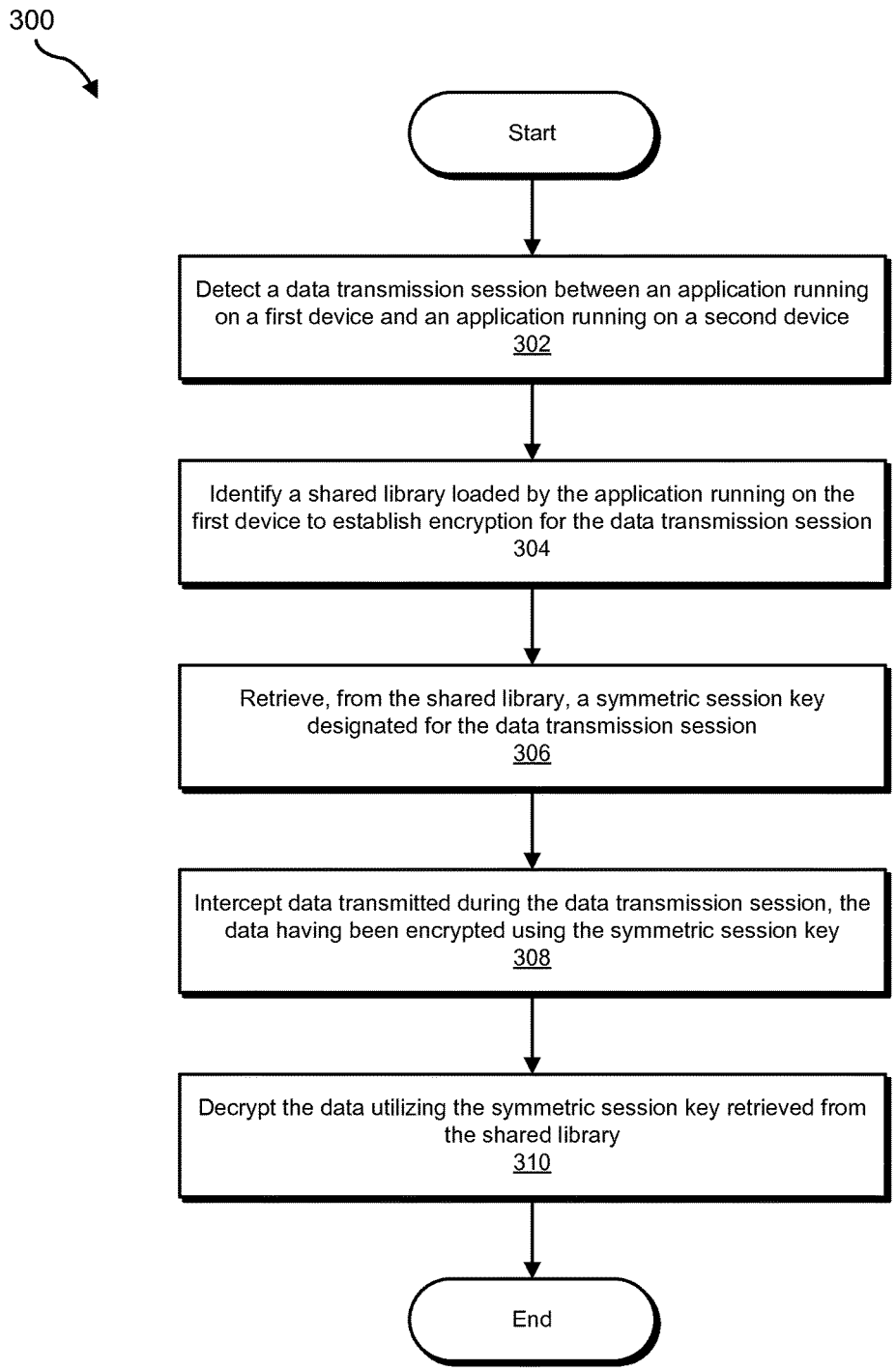
FIG. 3 is a flow diagram of an exemplary method for monitoring encrypted data transmission.

FIG. 3 is a flow diagram of an exemplary computer-implemented method 300 for monitoring encrypted data transmission. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302, one or more of the systems described herein may detect a data transmission session between an application running on a first device and an application running on a second device. For example, detection module 104 may, as part of computing device 202, computing device 208, and/or remote monitoring node 206 in FIG. 2, detect a data transmission session between application 210 running on computing device 202 and application 218 running on computing device 208.

As used herein, the term "application" may generally refer to any program, set of computer-executable instructions, and/or process. In some examples, an application may include a set of one or more programs that perform one or more coordinated functions. In some examples, the application may perform functions that enable a computing device to securely exchange data with another computing device. For example, the application may be responsible for establishing encrypted data transmission sessions. In this example, the application may load a shared library that creates, receives, and/or stores asymmetric public keys and/or symmetric session keys for use in data transmission sessions. In some examples, the application may represent a web browser. Additionally or alternatively, the application may function as part of a web server.

As used herein, the term "data transmission session" generally refers to an exchange of data between two or more computing devices. In some examples, the data transmission session may correspond to a symmetric session key. In these examples, the data transmission session may refer to a series of one or messages that are encrypted with the symmetric session key prior to being transmitted between the two or more computing devices. Additionally or alternatively, the data transmission session may be established at a certain point in time and continue until a terminating event has occurred (e.g., until a participating computing device has logged out of the data transmission session and/or until a certain amount of time has passed). In this example, the data transmission session may refer to messages transmitted between the two or more computing devices after the certain point in time but before the terminating event.

In some examples, the exchanged data may represent client-server communications. For example, the data may be exchanged between a user device and a web server. As a specific example, a user device may transmit username and password information to a web server of an online banking service and the web server may transmit information to the user device relating to a bank account of a user associated with the username and password information. In additional or alternative examples, the exchanged data may represent server-server communications. In some examples, the exchanged data may represent communications between nodes on a network. Additionally or alternatively, the exchanged data may represent communications between a mail server and a mail client device.

Figure 4:
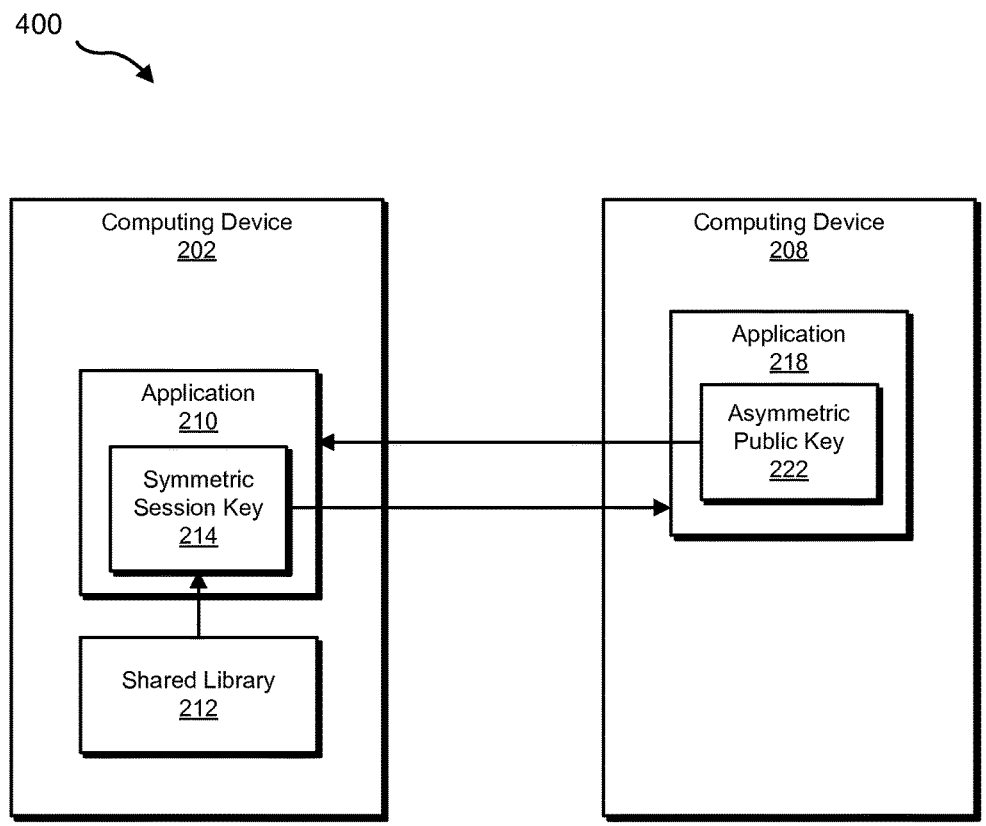
FIG. 4 is a block diagram of an exemplary data transmission encryption protocol.

In some examples, the data may be exchanged using an encryption protocol that uses a combination of asymmetric cryptography and symmetric cryptography, such as Secure Sockets Layer or Transport Layer Security. FIG. 4 illustrates an exemplary system that implements an exemplary data transmission protocol that uses a combination of asymmetric cryptography and symmetric cryptography. In these examples, as illustrated in FIG. 4, application 218 may initiate encryption for the data transmission session by sending asymmetric public key 222 to application 210. As used herein, the term "asymmetric public key" generally refers to a public key that functions as part of a public key-private key pair. As used herein, the term "public key-private key pair" generally refers to two keys, one of which (the public key) is used to encrypt plaintext to create ciphertext and the other of which (the private key) is used to decrypt the created ciphertext.

Once application 210 receives asymmetric public key 222, application 210 may receive symmetric session key 214 from shared library 212, encrypt symmetric session key 214 using asymmetric public key 222, and send the encrypted symmetric session key 214 to application 218. As used herein, the term "symmetric session key" generally refers to a single key that is used both for encrypting plaintext to create ciphertext and to decrypt the created ciphertext. Once application 218 has received the encrypted version of symmetric session key 214, both application 210 and application 218 may use symmetric session key 214 to encrypt data intended for the other computing device prior to sending the data.

Returning to FIGS. 2 and 3, detection module 104 may detect the data transmission session (e.g., as subject to one or more of the steps described herein) in response to detecting any of a variety of events. In some examples, detection module 104 may detect the data transmission session in response to determining that computing device 202 has attempted to access a resource of computing device 208 and/or that computing device 208 has attempted to access a resource of computing device 202. For example, in embodiments where computing device 202 represents a user device and computing device 208 represents a web server, detection module 104 may detect the data transmission session by determining that computing device 202 has attempted to access an Internet resource, such as a webpage, of computing device 208.

In some examples, detection module 104 may detect the data transmission session in response to determining that the data transmission session is encrypted. In some examples, detection module 104 may detect the data transmission session in response to determining that computing device 202 or computing device 208 has attempted to send data to the other computing device. For example, in embodiments where the data transmission session uses a combination of asymmetric cryptography and symmetric cryptography, detection module 104 may detect the data transmission session by determining that application 210 has received asymmetric public key 222 from application 218 running on the second device. In some examples, detection module 104 may detect the data transmission session in response to determining that the data transmission session is encrypted.

In some examples, detection module 104 may function according to criteria included in security policy 122. In these examples, detection module 104 may detect the data transmission session by determining that that disclosed systems and methods are authorized to monitor the data transmission session.

As used herein, the term "security policy" generally refers to any policy that designates a type of communication that the disclosed systems and methods have permission to monitor. For example, security policy 122 may give the disclosed systems and methods permission to monitor data transmission sessions that include a specified characteristic. In these examples, security policy 122 may limit which data transmission sessions may be monitored to only those data transmission sessions that include the specified characteristic indicated by security policy 122. In some examples, security policy 122 may limit which data transmission sessions may be monitored by limiting access to session keys. For example, security policy 122 may limit the disclosed systems and methods to only accessing session keys of data transmission sessions that include the specified characteristic.

Examples of the specified characteristic may include, without limitation, a reputation score of computing device 202 and/or computing device 208 that exceeds a threshold score designated by security policy 122, a geographic location of computing device 202 and/or computing device 208 that matches a location designated by security policy 122, a time at which the data transmission session is initiated that falls within a time period designated by security policy 122, content of a webpage accessed as part of the data transmission session that matches content designated by security policy 122, an Internet service provider utilized by the data transmission session that matches an Internet service provider designated by security policy 122, and/or an IP address of computing device 202 and/or computing device 208. In these examples, detection module 104 may determine that the disclosed systems and methods are authorized to monitor the data transmission by determining that the data transmission session includes the specified characteristic designated in security policy 122.

In some examples, security policy 122 may deny access to session keys of data transmission sessions with a characteristic that has been designated as trusted. In some examples, security policy 122 may deny access to session keys of sensitive data transmission sessions (e.g., if the security risks associated with granting access to the session keys outweighs the potential benefits). In some examples, security policy 122 may deny access to session keys of data transmission sessions that are subject to separate security standards and/or that are to be monitored by a separate security system than a security system that is generally responsible for monitoring data flows leaving and/or entering the computing device (e.g., computing device 202 and/or computing device 208).

At step 304, one or more of the systems described herein may identify a shared library loaded by the application running on the first device to establish encryption for the data transmission session. For example, identification module 106 may, as part of computing device 202 and/or remote monitoring node 206 in FIG. 2, identify shared library 212 loaded by application 210 running on computing device 202.

As used herein, the term "shared library" generally refers to a collection of executable resources (e.g., methods, functions, and/or procedures) that may be accessed by applications, such as application 210 and/or application 218. In some examples a shared library may create, receive, and/or maintain symmetric session keys and/or asymmetric public keys for data transmission sessions. In some examples, the term "shared library" may refer to a dynamically linked library.

Identification module 106 may identify shared library 212 in a variety of ways. In examples where detection module 104 determines that the data transmission session is encrypted, as discussed above in connection with step 302, identification module 106 may identify shared library 212 in response to the determination made by detection module 104. For example, identification module 106 may, in response to the determination made by detection module 104, identify an application, such as application 210, that is involved in the data transmission session. In this example, identification module 106 may then identify shared library 212 by determining that application 210 relies on shared library 212 to handle session keys.

In some examples, identification module 104 may determine that shared library 212 handles session keys for one or more applications running on computing device 202. In these examples, identification module 104 may monitor shared library 212 for any activity that indicates that an encrypted data transmission session has been initiated.

Figure 5:
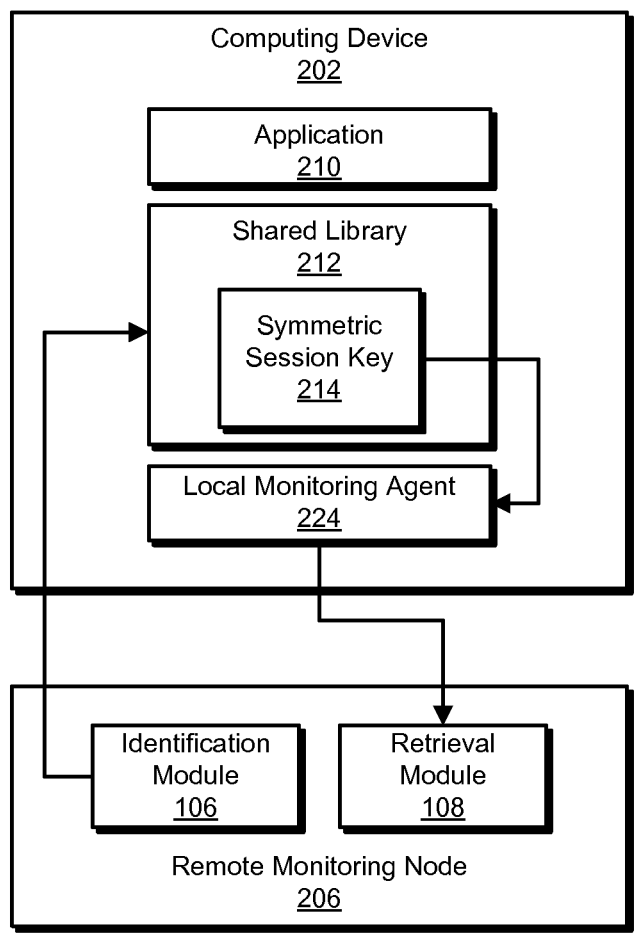
FIG. 5 is a block diagram of an exemplary computing system for retrieving a symmetric session key from a shared library.
Figure 6:
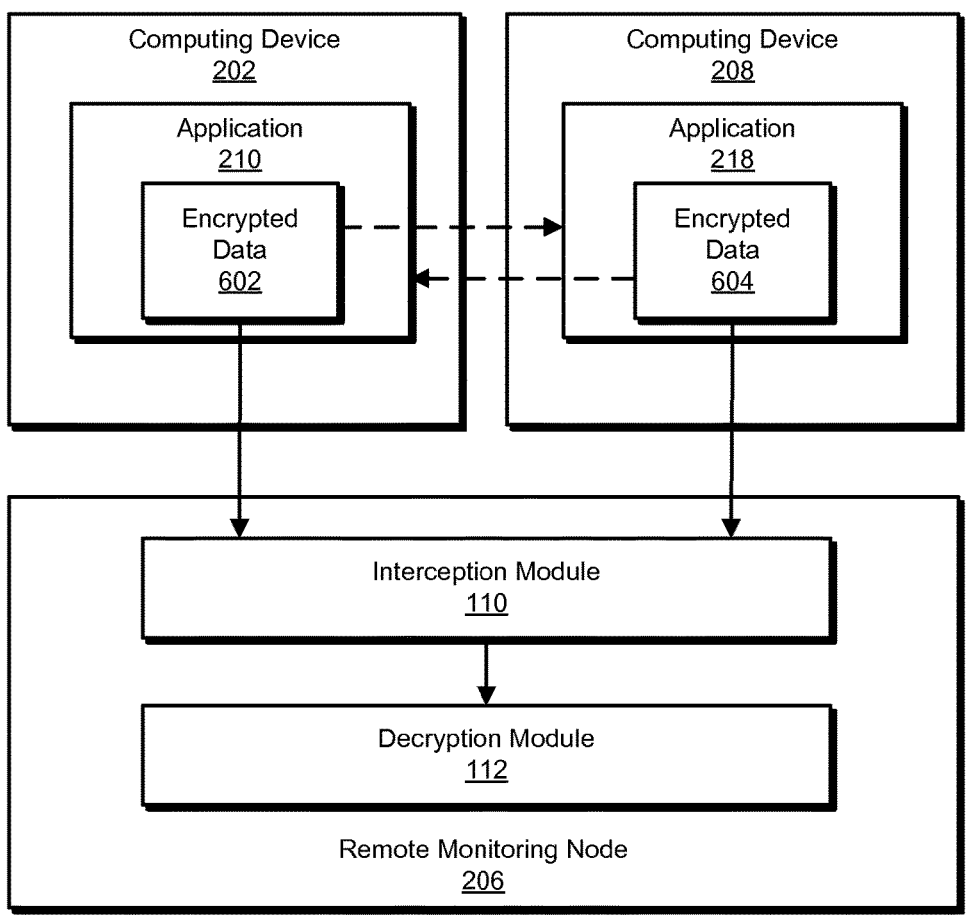
FIG. 6 is a block diagram of an exemplary computing system for intercepting and decrypting data using a retrieved symmetric session key.

Identification module 106 may identify shared library 212 in a variety of contexts. In one embodiment, identification module 106 may operate as part a local monitoring agent, such as local monitoring agent 216, that runs on computing device 202 and monitors the activities of shared library 212. In some examples, local monitoring agent 216 may function as part of a monitoring service. For example, local monitoring agent 216 may function as part of a same monitoring service that manages remote monitoring node 206. In some examples, as shown in FIG. 5, identification module 106 may operate as part of remote monitoring node 206 and may identify shared library 212 remotely.

In some examples, local monitoring agent 216 may be configured to monitor the activities of only shared library 212. In other examples, local monitoring agent 216 may monitor two or more shared libraries that are used in establishing encrypted data transmission sessions. In these examples, after detection module 104 has detected the data transmission session, identification module 106 may identify shared library 212 in response to determining which of the two or more shared libraries is responsible for handling symmetric session keys for the detected data transmission session. In additional or alternative embodiments, identification module 106 may identify a shared library loaded by application 218 on computing device 208. These embodiments will be discussed in greater detail in connection with step 306.

Returning to FIG. 3, at step 306, one or more of the systems described herein may retrieve, from the shared library, a symmetric session key designated for the data transmission session. For example, retrieval module 108 may, as part of remote monitoring node 206 in FIG. 2, retrieve, from shared library 212, symmetric session key 214 designated for the data transmission session.

In some examples, retrieval module 108 may function as part of local monitoring agent 216. Additionally or alternatively, retrieval module 108 may operate as part of remote monitoring node 206, as shown in FIG. 5. In these examples, local monitoring agent 216 may retrieve symmetric session key 214 and retrieval module 108 may receive symmetric session key 214 from local monitoring agent 216.

In some examples, local monitoring agent 216 may retrieve symmetric session key 214 by hooking a method of shared library 212. As used herein, the term "hooking" refers to any process for altering and/or extending the behavior of a block of code, a method, and/or API (e.g., by intercepting calls that invoke a method and/or an API and redirecting the calls to another location with executable code to perform the desired behavior). In some embodiments, local monitoring agent 216 may retrieve symmetric session key 214 from shared library 212 by hooking an API of shared library 212. By hooking the API, local monitoring agent 216 may identify system calls that invoke the API. For example, local monitoring agent 216 may identify a call that invokes handling symmetric session key 214. In one example, hooking the API may include modifying a method table of shared library 212. For example, the method table may include an entry for a method responsible for handling symmetric session keys and local monitoring agent 216 may modify the method table such that calls to the method are instead redirected to a memory address associated with local monitoring agent 216.

As a specific example, local monitoring agent 216 may modify the method table such that calls to a method responsible for creating symmetric session keys are redirected to a memory address associated with local monitoring agent 216. In this example, application 210 may call the method responsible for creating symmetric session keys to obtain a symmetric session key for the data transmission session. However, in response to local monitoring agent 216 having modified the method table, the call may be redirected to a memory address associated with local monitoring agent 216. After receiving the call intended for the method responsible for creating symmetric session keys, local monitoring agent 216 may forward the call to the method responsible for creating symmetric session keys. Upon receiving the call from local monitoring agent 216, the method for creating symmetric session keys may respond to the call by creating symmetric session key 214 and sending symmetric session key 214 to local monitoring agent 216. Upon receiving symmetric session key 214, local monitoring agent 216 may, as discussed above and as shown in FIG. 5, send symmetric session key 214 to retrieval module 108. Additionally, shared library 212 may send symmetric session key 214 to application 210. In some examples, the disclosed hooking of the API may be performed at run-time, thereby allowing retrieval module 108 to extract session key 214 at run-time.

In one example, retrieval module 108 may receive symmetric session key 214 at remote monitoring node 206 via an additional data transmission session between local monitoring agent 216 and an application running on remote monitoring node 206. In this example, the additional data transmission session may be distinct from the data transmission session between the application running first device and the application running on the second device. In some examples, the additional data transmission session may utilize an encryption protocol similar to the encryption protocols described above in connection with the data transmission session at step 302. In these examples, remote monitoring node 206 may initiate encryption for the additional data transmission session by sending an additional asymmetric public key (that is separate and distinct from asymmetric public key 222) to local monitoring agent 216. Once local monitoring agent 216 receives the additional asymmetric public key, local monitoring agent 216 may encrypt symmetric session key 214 using the additional asymmetric public key and send the version of symmetric session key 214 encrypted with the additional asymmetric public key to remote monitoring node 206.

In embodiments where identification module 106 identifies a shared library loaded by application 218 on computing device 208, as discussed above in connection with step 304, retrieval module 108 may retrieve symmetric session key 214 from the shared library loaded by application 218. In these embodiments, the shared library loaded by application 218 may receive symmetric session key 214 from application 210. In one example, application 218 may have previously sent asymmetric public key 222 to application 210 and the shared library loaded by application 218 may receive a version of symmetric session key 214 that application 210 has encrypted with asymmetric public key 222 received from application 218.

In some examples, local monitoring agent 224 may retrieve symmetric session key 214 from the shared library loaded by application 218 and send symmetric session key 214 to remote monitoring node 206. In some embodiments, local monitoring agent 224 may retrieve symmetric session key 214 from the shared library loaded by application 218 by hooking an API of the shared library loaded by application 218. For example, local monitoring agent 224 may hook the API of the shared library loaded by application 218 in a similar manner to the hooking discussed above in connection with hooking the API of shared library 212.

In some examples, retrieval module 108 may receive symmetric session key 214 at remote monitoring node 206 via an additional data transmission session between local monitoring agent 224 and an application running on remote monitoring node 206 in a manner similar to that discussed above in connection with utilizing the additional data transmission session between local monitoring agent 216 and remote monitoring node 206.

Returning to FIG. 3, at step 308, one or more of the systems described herein may intercept data transmitted during the data transmission session, the data having been encrypted using the symmetric session key. For example, interception module 110 may, as part of remote monitoring node 206 in FIG. 2, intercept data transmitted during the data transmission session, the data having been encrypted using symmetric session key 214.

Interception module 110 may intercept the data transmitted during the data transmission session in a variety of ways. In some examples, interception module 110 may intercept the data received by application 210 and/or application 218. Using FIG. 6 as a specific example, interception module 110 may intercept encrypted data 604 that application 210 is attempting to receive from application 218. Additionally or alternatively, interception module 110 may intercept the data being sent by application 210 and/or application 218. Using FIG. 6 as a specific example, interception module 110 may intercept encrypted data 602 that application 210 is attempting to send to application 218. In these examples, encrypted data 602 and encrypted data 604 may have been encrypted with symmetric session key 214 before being transmitted.

In some examples, where remote monitoring node 206 represents a firewall, interception module 110 may intercept encrypted data 602 and/or encrypted data 604 as part of the firewall. In some examples, interception module 110 may intercept all communications exchanged with computing device 202 and/or computing device 208. For example, interception module 110 may monitor all network traffic passing to and/or from computing device 202 and/or computing device 208. Additionally or alternatively, interception module 110 may only intercept certain communications. For example, interception module 110 may only intercept communications corresponding to data transmission sessions that security policy 122 authorizes the disclosed systems and methods to monitor, as discussed above in connection with step 302.

In some examples, interception module 110 may intercept the data transmitted during the data transmission session via passive monitoring and/or data capturing. For example, interception module 110 may intercept the data without interfering with the flow of data transmission between computing device 202 and computing device 208. In some examples, interception module 110 may intercept the data transmitted during the data transmission session by preventing the data from being transmitted, at least temporarily, until the data may be analyzed. For example, interception module 110 may prevent the data from being transmitted until the data is decrypted and a policy is applied to the data (e.g., a data-loss-protection policy and/or a network security policy).

Returning to FIG. 3, at step 310, one or more of the systems described herein may decrypt the data utilizing the symmetric session key retrieved from the shared library. For example, decryption module 112 may, as part of remote monitoring node 206 in FIG. 2, decrypt the data utilizing symmetric session key 214 retrieved from shared library 212. As a specific example, decryption module 112 may decrypt encrypted data 602 in FIG. 6 and/or encrypted data 604 in FIG. 6 utilizing symmetric session key 214.

In some examples, upon decrypting the data, decryption module 112 may apply security policy 122 to the decrypted data by analyzing the decrypted data to determine whether the decrypted data complies with security policy 122. For example, in embodiments where security policy 122 includes a data-loss-protection policy, decryption module 112 may analyze the decrypted data to determine whether the decrypted data complies with and/or violates the data-loss-protection policy. As a specific example, computing device 202 may represent a computing system managed by a business entity and the data-loss-protection policy may prohibit users of computing device 202 from distributing information that the business entity has classified as confidential. In this specific example, decryption module 112 may analyze the decrypted data to determine whether the decrypted data includes the confidential information. Applying a data-loss-prevention policy, as disclosed herein, my allow monitoring entities to ensure that the transmission of encrypted data is authorized before permitting the transmission of the encrypted data.

In an additional or alternative examples, security policy 122 may include a policy directed at protecting computing device 202 and/or computing device 208 from malicious attacks. In these examples, decryption module 112 may analyze the decrypted data to determine whether the decrypted data includes content designated in security policy 122 as potentially posing a threat to computing device 202 and/or computing device 208. Applying a policy directed at protecting computing devices from malicious attacks, as disclosed herein, may prevent malicious actors from avoiding detection by security services by encrypting malicious content prior to transmitting the malicious content.

In some examples, decryption module 112 may perform a security action based on a result of applying security policy 122 to the decrypted data. Using FIG. 6 as a specific example, if decryption module 112 determines that encrypted data 602 violates a data-loss-protection policy included in security policy 122, decryption module 112 may cause application 210 to be blocked from sending encrypted data 602 to application 218. As another example, if decryption module 112 determines that encrypted data 604 in FIG. 6 includes content with a characteristic that is designated in security policy 122 as potentially posing a threat to computing device 202, decryption module 112 may cause application 210 to be blocked from receiving encrypted data 604.

As discussed above, the disclosed systems and methods may monitor encrypted data transmission. For example, the disclosed systems and methods may retrieve a symmetric session key, designated for a data transmission session, from a shared library of a device involved in the data transmission session. After retrieving the symmetric session key, the disclosed systems and methods may intercept data, encrypted with the symmetric session key, that is transmitted to and/or from the device during the data transmission session. The disclosed systems and methods may then decrypt the intercepted data using the retrieved symmetric session key and apply a policy to the intercepted data.

Retrieving and utilizing the symmetric session key in this way may allow the disclosed systems and methods to effectively monitor data that the application of the application of the device is transmitting without obtaining a decrypted version of the data from the device. In examples where the device is exchanging data with other devices using an encryption protocol that utilizes a combination of asymmetric cryptography and symmetric cryptography, retrieving the symmetric session key used by the device may allow the disclosed systems and methods to monitor the data exchange without accessing a private key used as part of the encryption protocol. Limiting a monitoring service to accessing a symmetric session key, as opposed to allowing the monitoring service to access a private key, may limit the potential damage that may be caused by the monitoring service. For example, if data maintained by the monitoring service were leaked and/or stolen by malicious actors, the resulting damage would be limited in scope to the data transmission session associated with the leaked and/or symmetric session key, instead of extending to all data transmission sessions connected with the private key.

Figure 7:
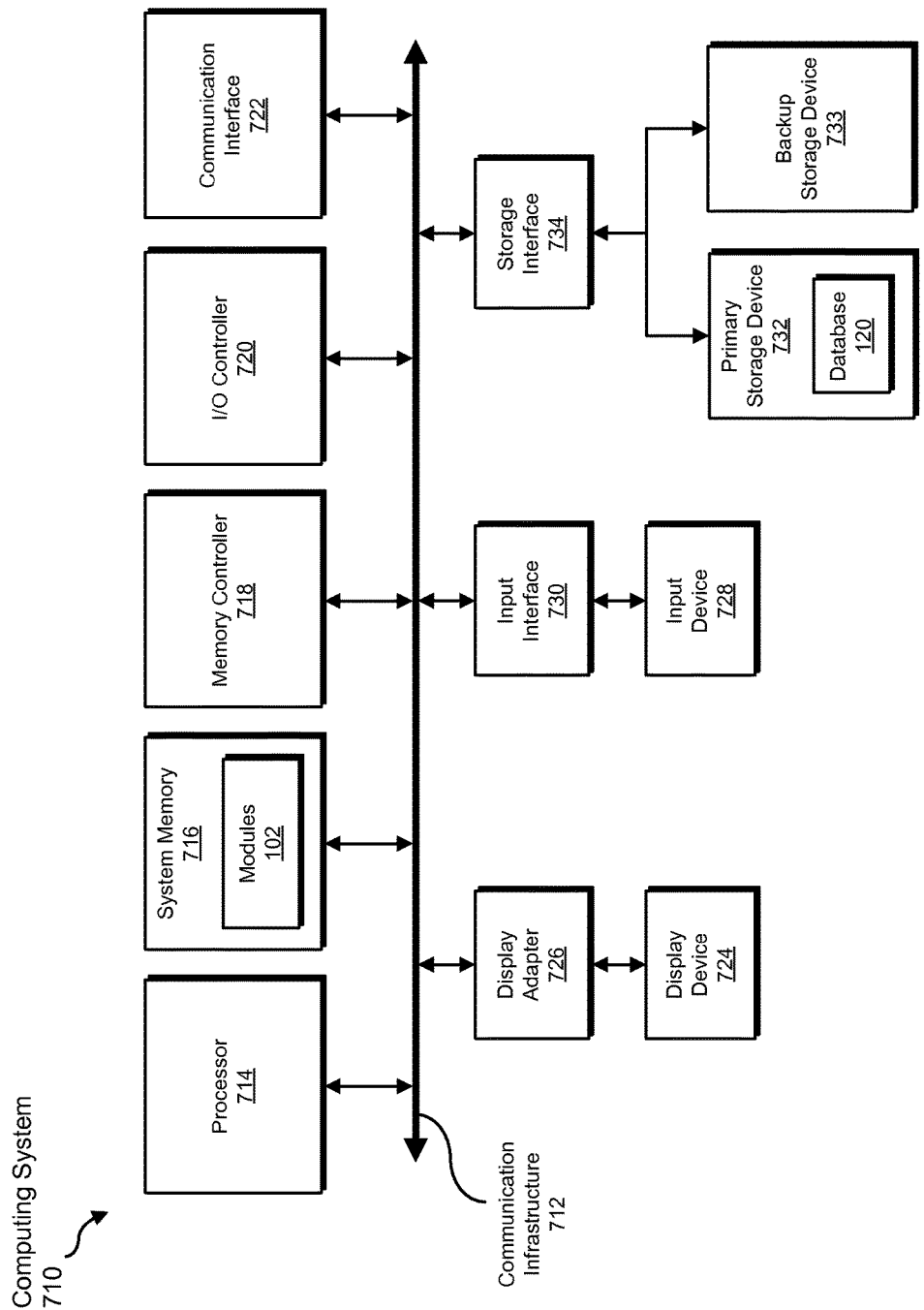
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
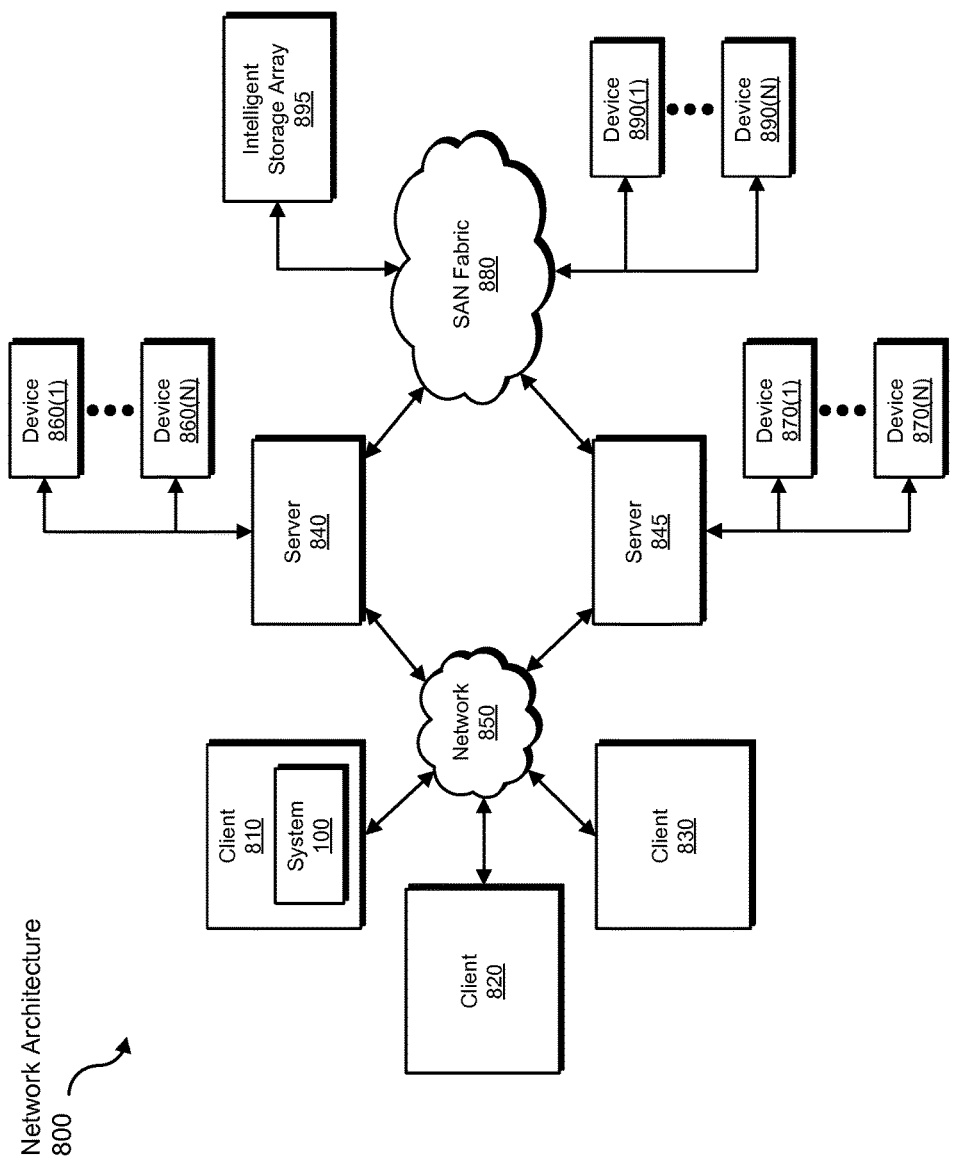
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for monitoring encrypted data transmission.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive encrypted data, transform the encrypted data into decrypted data, and analyze a result of the transformation for compliance with a policy. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for monitoring encrypted data transmission, at least a portion of the method being performed by a computing device comprising at least one processor, the method comprising:
    detecting a data transmission session between an application running on a first device and an application running on a second device;
    identifying a shared library loaded by the application running on the first device to establish encryption for the data transmission session;
    retrieving, from the shared library, a symmetric session key designated for the data transmission session by:
        retrieving the symmetric session key via a local monitoring agent, on the first device, that monitors the shared library to identify system calls that invoke at least one method of the shared library responsible for handling symmetric session keys; and
        receiving the symmetric session key at a remote monitoring node that intercepts and analyzes communications transmitted to and/or from the first device, wherein:
            the remote monitoring node is separate and distinct from the first device and the second device; and
            the remote monitoring node receives the symmetric session key via an additional data transmission session between the local monitoring agent on the first device and an application running on the remote monitoring node, wherein the additional data transmission session is distinct from the data transmission session between the application running first device and the application running on the second device;
    intercepting data transmitted during the data transmission session, the data having been encrypted using the symmetric session key; and
    decrypting the data utilizing the symmetric session key retrieved from the shared library.

2. The computer-implemented method of claim 1, wherein detecting the data transmission session comprises at least one of:
    determining that the application running on the first device has received an asymmetric public key from the application running on the second device; and
    determining that the first device has attempted to access an Internet resource of the second device.

3. The computer-implemented method of claim 1, wherein:
    the application running on the first device establishes the encryption for the data transmission session by:
        obtaining, from the shared library, the symmetric session key;
        encrypting the symmetric session key with an asymmetric public key received from the application running on the second device; and
        sending the encrypted symmetric session key to the application running on the second device; and
    prior to transmitting the data, at least one of the application running on the first device and the application running on the second device encrypts, using the symmetric session key, the data transmitted during the data transmission session.

4. The computer-implemented method of claim 1, wherein:
    prior to retrieving the symmetric session key from the shared library, the shared library receives the symmetric session key from the application running on the second device; and
    prior to the shared library receiving the symmetric session key from the application running on the second device:
        the application running on the first device sends an asymmetric public key to the application running on the second device; and
        the application running on the second device encrypts the symmetric session key with the asymmetric public key.

5. The computer-implemented method of claim 1, wherein detecting the data transmission session comprises determining that a monitoring system is authorized to monitor the data transmitted during the data transmission session by:
    identifying a policy that gives the monitoring system permission to monitor data transmission sessions that include a specified characteristic; and
    determining that the data transmission session includes the specified characteristic designated in the policy.

6. The computer-implemented method of claim 5, wherein the specified characteristic comprises at least one of:
    a reputation score of the first device and/or the second device that exceeds a threshold score designated by the policy;
    a location of the first device and/or the second device that matches a location designated by the policy;
    a time at which the data transmission session is initiated that falls within a time period designated by the policy;
    content of a webpage accessed as part of the data transmission session that matches content designated by the policy; and
    an Internet service provider utilized by the data transmission session that matches an Internet service provider designated by the policy.

7. The computer-implemented method of claim 5, wherein the monitoring system comprises at least one of:
    the remote monitoring node; and
    the local monitoring agent.

8. The computer-implemented method of claim 1, wherein:
the local monitoring agent monitors the shared library by hooking an application programming interface of the shared library to identify system calls that invoke the application programming interface.

9. The computer-implemented method of claim 8, wherein hooking the application programming interface comprises modifying a method table of the shared library, the method table comprising at least one entry for the at least one method responsible for handling symmetric session keys, such that calls to the at least one method are redirected to a memory address associated with the local monitoring agent.

10. The computer-implemented method of claim 8, wherein the local monitoring agent hooks the application programming interface of the shared library at run-time.

11. The computer-implemented method of claim 1, wherein the remote monitoring node receives the symmetric session key via an additional data transmission session by:
sending an asymmetric public key to the local monitoring agent; and
receiving, from the local monitoring agent, a version of the symmetric session key that has been encrypted using the asymmetric public key from the remote monitoring node.

12. The computer-implemented method of claim 1, further comprising, upon decrypting the data, applying a security policy to the decrypted data by analyzing the decrypted data to determine whether the decrypted data complies with the policy.

13. The computer-implemented method of claim 12, wherein intercepting the data comprises temporarily preventing the data from being transmitted at least until the security policy is applied to the decrypted data.

14. The computer-implemented method of claim 12, further comprising performing a security action based on a result of applying the security policy to the decrypted data.

15. A system for monitoring encrypted data transmission, the system comprising:
a detection module, stored in memory, that detects a data transmission session between an application running on a first device and an application running on a second device;
an identification module, stored in memory, that identifies a shared library loaded by the application running on the first device to establish encryption for the data transmission session;
a retrieval module, stored in memory, that retrieves, from the shared library, a symmetric session key designated for the data transmission session by:
retrieving the symmetric session key via a local monitoring agent, on the first device, that monitors the shared library to identify system calls that invoke at least one method of the shared library responsible for handling symmetric session keys; and
receiving the symmetric session key at a remote monitoring node that intercepts and analyzes communications transmitted to and/or from the first device, wherein:
the remote monitoring node is separate and distinct from the first device and the second device; and
the remote monitoring node receives the symmetric session key via an additional data transmission session between the local monitoring agent on the first device and an application running on the remote monitoring node, wherein the additional data transmission session is distinct from the data transmission session between the application running first device and the application running on the second device;
an interception module, stored in memory, that intercepts data transmitted during the data transmission session, the data having been encrypted using the symmetric session key;
a decryption module, stored in memory, that decrypts the data utilizing the symmetric session key retrieved from the shared library; and
at least one physical processor configured to execute the detection module, the identification module, the retrieval module, the interception module, and the decryption module.

16. The system of claim 15, wherein the detection module detects the data transmission session by at least one of:
determining that the application running on the first device has received an asymmetric public key from the application running on the second device; and
determining that the first device has attempted to access an Internet resource of the second device.

17. The system of claim 15, wherein:
the application running on the first device establishes the encryption for the data transmission session by:
obtaining, from the shared library, the symmetric session key;
encrypting the symmetric session key with an asymmetric public key received from the application running on the second device; and
sending the encrypted symmetric session key to the application running on the second device; and
prior to transmitting the data, at least one of the application running on the first device and the application running on the second device encrypts, using the symmetric session key, the data transmitted during the data transmission session.

18. The system of claim 15, wherein:
prior to retrieving the symmetric session key from the shared library, the shared library receives the symmetric session key from the application running on the second device;
prior to the shared library receiving the symmetric session key from the application running on the second device:
the application running on the first device sends an asymmetric public key to the application running on the second device; and
the application running on the second device encrypts the symmetric session key with the asymmetric public key.

19. The system of claim 15, wherein the detection module detects the data transmission session by determining that a monitoring system is authorized to monitor the data transmitted during the data transmission session, wherein the determining comprises:
identifying a policy that gives the monitoring system permission to monitor data transmission sessions that include a specified characteristic; and
determining that the data transmission session includes the specified characteristic designated in the policy.

20. A non-transitory computer-readable medium comprising one or more computer-readable instructions that, when executed by at least one processor of a computing device, cause the computing device to:
detect a data transmission session between an application running on a first device and an application running on a second device;

identify a shared library loaded by the application running on the first device to establish encryption for the data transmission session;

retrieve, from the shared library, a symmetric session key designated for the data transmission session by:

retrieving the symmetric session key via a local monitoring agent, on the first device, that monitors the shared library to identify system calls that invoke at least one method of the shared library responsible for handling symmetric session keys; and receiving the symmetric session key at a remote monitoring node that intercepts and analyzes communications transmitted to and/or from the first device, wherein:

the remote monitoring node is separate and distinct from the first device and the second device; and the remote monitoring node receives the symmetric session key via an additional data transmission session between the local monitoring agent on the first device and an application running on the remote monitoring node, wherein the additional data transmission session is distinct from the data transmission session between the application running first device and the application running on the second device;

intercept data transmitted during the data transmission session, the data having been encrypted using the symmetric session key; and decrypt the data utilizing the symmetric session key retrieved from the shared library.

* * * * *